United States Patent
Yacov et al.

(10) Patent No.: US 9,351,475 B2
(45) Date of Patent: May 31, 2016

(54) PORTABLE ANIMAL WATERING, FEEDING, AND WASTE BAG STORING APPARATUS

(71) Applicants: Gonen Yacov, Santa Monica, CA (US); Albin Gielicz, Santa Monica, CA (US)

(72) Inventors: Gonen Yacov, Santa Monica, CA (US); Albin Gielicz, Santa Monica, CA (US)

(*) Notice: Subject to any disclaimer, the term of this patent is extended or adjusted under 35 U.S.C. 154(b) by 138 days.

(21) Appl. No.: 14/297,876

(22) Filed: Jun. 6, 2014

(65) Prior Publication Data

US 2014/0360434 A1    Dec. 11, 2014

Related U.S. Application Data

(60) Provisional application No. 61/832,483, filed on Jun. 7, 2013.

(51) Int. Cl.
*A01K 7/00* (2006.01)
*A01K 5/01* (2006.01)

(52) U.S. Cl.
CPC ............... *A01K 7/00* (2013.01); *A01K 5/0114* (2013.01)

(58) Field of Classification Search
CPC ....... A01K 1/035; A01K 5/0114; A01K 7/00; A01K 7/005; A01K 29/00; A01K 5/01
USPC ............. 119/51.5, 61.5, 61.56, 72, 867, 174, 119/702, 707
See application file for complete search history.

(56) References Cited

U.S. PATENT DOCUMENTS

| | | | | |
|---|---|---|---|---|
| 4,192,256 A | * | 3/1980 | Clugston | A01K 5/0135 119/51.5 |
| 5,488,927 A | * | 2/1996 | Lorenzana | A01K 7/02 119/51.5 |
| 5,738,039 A | * | 4/1998 | Berman | A01K 7/04 119/72 |
| 5,823,136 A | * | 10/1998 | Zarski | A01K 7/00 119/51.5 |
| 6,619,230 B1 | * | 9/2003 | Kimbrough | A01K 5/0114 119/61.56 |
| 6,718,911 B2 | | 4/2004 | Greenberg | |
| 6,874,445 B2 | * | 4/2005 | Polimeni, Jr. | A01K 7/02 119/51.5 |

(Continued)

OTHER PUBLICATIONS

Contavalli, et al., "Client IP information in DNS requests", Internet-Draft document draft-vandergaast-edns-clientip-01, May 21, 2010, 23 pages.

*Primary Examiner* — Lisa Tsang
(74) *Attorney, Agent, or Firm* — Los Angeles Patent Group; Arman Katiraei

(57) ABSTRACT

A portable animal watering, feeding, and waste bag storage and dispensing apparatus. The apparatus includes a body with a first chamber for storing the liquid that is used by the animal to drink, a second chamber that stores the refuse bags, and a cover for the second chamber that further serves to dispense the bags from the second chamber. A first receptacle is coupled to the body and provides a watering dish to serve the liquid from the first chamber to the animal. In some embodiments, a shaft directly connects the first receptacle to the first chamber and an adjustable plug provides a user with means to control the transfer of the liquid from the first chamber to the first receptacle. A second receptacle is coupled to the body and is used to store and dispense food to the animal.

17 Claims, 14 Drawing Sheets

(56) References Cited

U.S. PATENT DOCUMENTS

| | | | |
|---|---|---|---|
| 6,971,331 B1 | 12/2005 | Rohrer | |
| D529,279 S * | 10/2006 | Parks | D3/203.3 |
| D552,843 S * | 10/2007 | Katz | D3/203.3 |
| 7,287,487 B2 | 10/2007 | Hurwitz | |
| D562,503 S * | 2/2008 | Zutis | D30/121 |
| 7,690,329 B2 | 4/2010 | Parks | |
| 8,047,159 B2 | 11/2011 | Hewson et al. | |
| 8,272,351 B2 | 9/2012 | Hurwitz | |
| 8,573,160 B1 * | 11/2013 | Knight | A01K 27/004 119/796 |
| D728,169 S * | 4/2015 | Yacov | D30/121 |
| 2006/0278169 A1 * | 12/2006 | Logan | A01K 7/00 119/61.56 |
| 2008/0216767 A1 * | 9/2008 | Wang | A01K 27/006 119/795 |
| 2009/0151645 A1 * | 6/2009 | Fangsrud | B65F 1/062 119/161 |
| 2010/0018468 A1 * | 1/2010 | Rabello | A01K 27/004 119/61.56 |
| 2010/0200455 A1 * | 8/2010 | Van Bokhoven | A01K 5/0114 206/541 |
| 2010/0219196 A1 * | 9/2010 | Alvino | A01K 7/00 220/810 |
| 2011/0290188 A1 * | 12/2011 | Lopez | A01K 27/008 119/72 |
| 2012/0137978 A1 * | 6/2012 | McBounds | A01K 7/00 119/72 |
| 2014/0158064 A1 * | 6/2014 | Cooligan-Knoefel | A01K 27/004 119/796 |

* cited by examiner

PORTABLE ANIMAL WATERING, FEEDING, AND WASTE BAG STORING APPARATUS

CLAIM OF BENEFIT TO RELATED APPLICATIONS

This application claims the benefit of U.S. provisional application 61/832,483, entitled "Portable Animal Watering, Feeding, and Waste Bag Storing Apparatus", filed Jun. 7, 2013. The contents of application 61/832,483 are hereby incorporated by reference.

TECHNICAL FIELD

The present invention pertains to a portable watering, feeding, and waste bag storing apparatus.

BACKGROUND

When performing any outdoor activity, a pet owner has the same responsibility for his or her pet as when the pet is at home. This includes ensuring that the animal is adequately hydrated, fed, and that any animal waste is removed off the site. Several patented products had been developed to address one or more of these needs, although there is no single product that has addressed all these needs collectively. In addition to these primary utilities, there are secondary utilities that should be integrated in such a product to seamlessly allow for watering, feeding, and waste removal without complicated manipulation of the product. In other words, there is a need that all three primary utilities be easily accessible to both the human and the pet.

SUMMARY OF THE INVENTION

Some embodiments provide an apparatus that is a portable all-in-one solution for animal or pet owners who spend time with their animals outdoors, walking, hiking, biking, camping, traveling, training, etc. The apparatus combines three different utilities in one unit. The apparatus provides for storing and dispensing water, food, and bags for waste removal. The apparatus conveniently clips on to the owner's belt and has a detachable shoulder strap as an alternative method for carrying.

The apparatus includes a body with a first receptacle coupled to one end of the body and a second receptacle coupled to the opposite end of the body. Collectively, the components have a shape representative of a dog bone. The apparatus can stand vertically or can be placed on its back where it can lay horizontally and allow the animal easy access to the food and water.

The body includes a first chamber that is separated from a second chamber. The first chamber has a first opening to a first volume which can be filled with a liquid. The second chamber has a second volume that is used for waste bag storage. Covering the second volume is a clasping door that opens to allow access to the second volume in order to replenish the waste bags. The clasping door includes an eyelet for dispensing the waste bags. Specifically, when the clasping door is shut, a portion of a waste bag can be inserted through the eyelet such that a user can access the waste bags without having to open the clasping door.

The first receptacle extends adjacent to the first chamber from a top end of the body. The first receptacle is used as a watering dish to serve the liquid from the first chamber to the animal. In some embodiments, the first receptacle includes an adjustable plug, a second volume, and a second opening that is aligned with the first opening of the first chamber. A shaft may connect the first and second openings and provide a channel for the flow of liquid between the first chamber and the first receptacle. A user can manipulate the adjustable plug by pushing it to a closed position or by pulling it to an open position. The closed position seals the first chamber storing the liquid by creating a blockage between the first opening and the second opening. This blockage prevents the transfer of the liquid from the first chamber to the first receptacle and allows the apparatus to be carried full of liquid without spillage. The open position removes the blockage, thereby allowing the transfer of the liquid from the first chamber to the first receptacle.

In some other embodiments, the first receptacle does not have an opening that connects to the first chamber and the first receptacle is an open volume. In some such embodiments, a male-female coupling mechanism allows the first receptacle to be decoupled from the body. Once decoupled, the user can access a screw-down cap that seals and unseals the first chamber. The user unscrews the cap so that he may then pour the liquid from the first chamber into the first receptacle. The first receptacle can then be placed on the ground to allow the animal to drink.

The second receptacle extends from a bottom end of the body. The second receptacle comprises a third volume that is used to store and dispense food or treats to the animal. A clasping door can be used to secure the food therein. When the user desires to serve the food, the user opens the clasping door and can lay the apparatus on its back to allow the animal to eat directly from the second receptacle.

BRIEF DESCRIPTION OF THE DRAWINGS

In order to achieve a better understanding of the nature of the present invention various embodiments including a preferred embodiment of the portable animal watering, feeding, and waste bag storing and dispensing apparatus will now be described, by way of example only, with reference to the accompanying drawings in which.

DETAILED DESCRIPTION OF THE INVENTION

In the following detailed description, numerous details, examples, and embodiments of a portable animal watering, feeding, and waste bag storing and dispensing apparatus are set forth and described. As one skilled in the art would understand in light of the present description, the apparatus is not limited to the embodiments set forth, and may be practiced without some of the specific details and examples discussed. Also, reference is made to the accompanying figures, which illustrate specific embodiments in which the apparatus can be practiced. It is to be understood that other embodiments can be used and structural changes can be made without departing from the scope of the embodiments herein described.

Some embodiments provide an apparatus that is a portable all-in-one solution for animal or pet owners who spend time with their animals outdoors, walking, hiking, biking, camping, traveling, training, etc. The apparatus combines three different utilities in one unit. The apparatus provides separate components or receptacles for storing and dispensing water, food, and bags for waste removal. The apparatus conveniently clips on to the owner's belt and has a detachable shoulder strap as an alternative method for carrying. The apparatus is stable and capable of standing vertically and lying horizontally when used for drinking and eating by the animal.

Figure 1A:
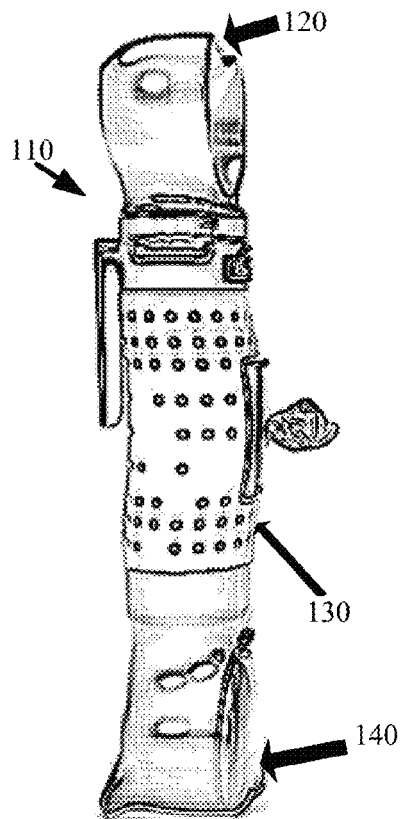
FIGS. 1A, 1B, and 1C display the apparatus from a side, front, and back view in accordance with some embodiments.
Figure 1B:
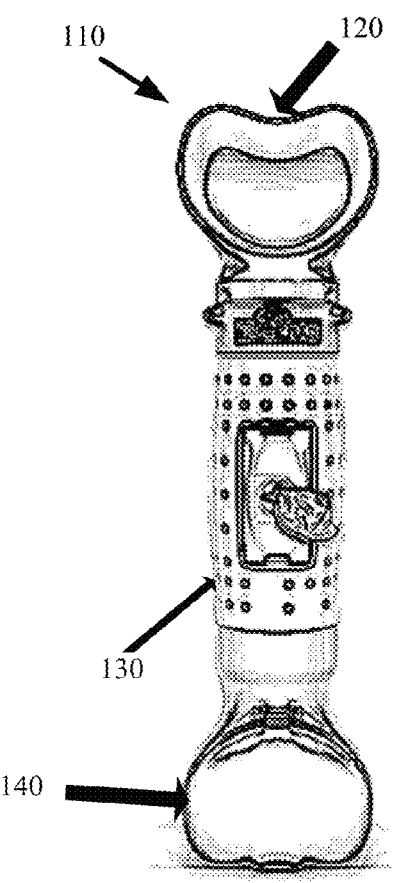
Figure 1C:
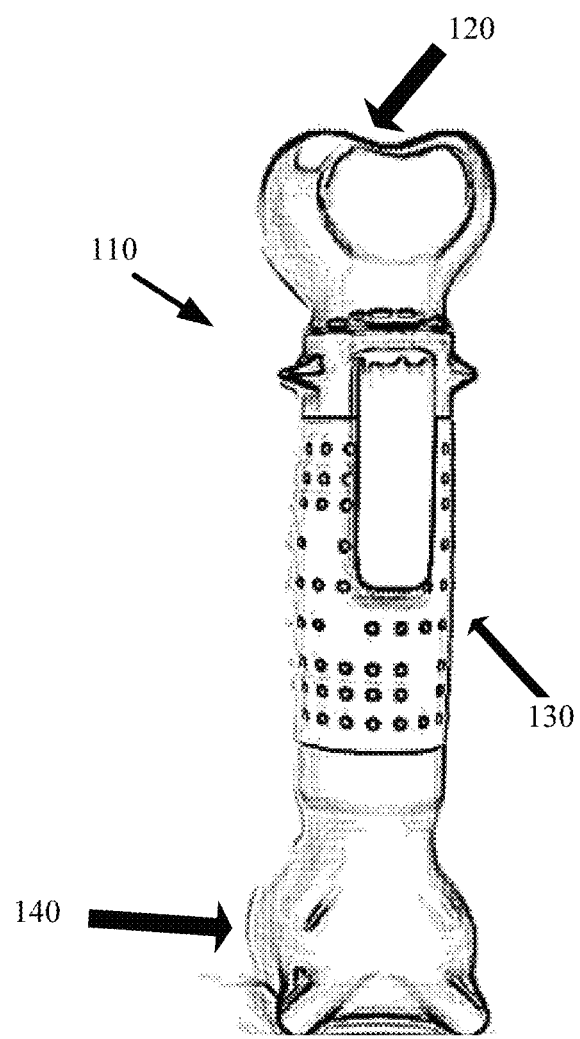
Figure 2A:
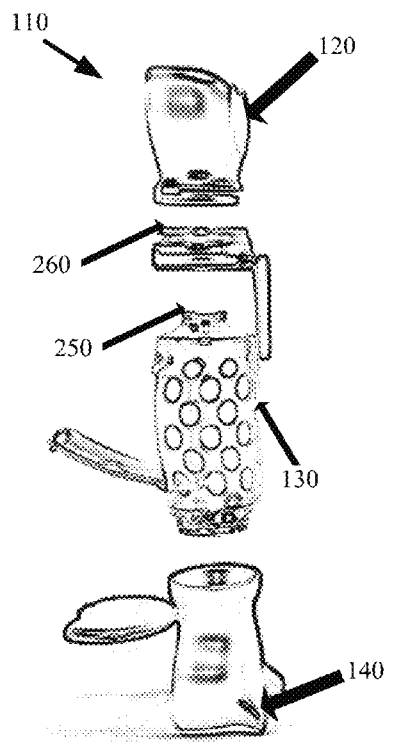
FIGS. 2A, 2B, 2C, and 2D provide an exploded view of the apparatus to illustrate the components of the overall unit.
Figure 2B:
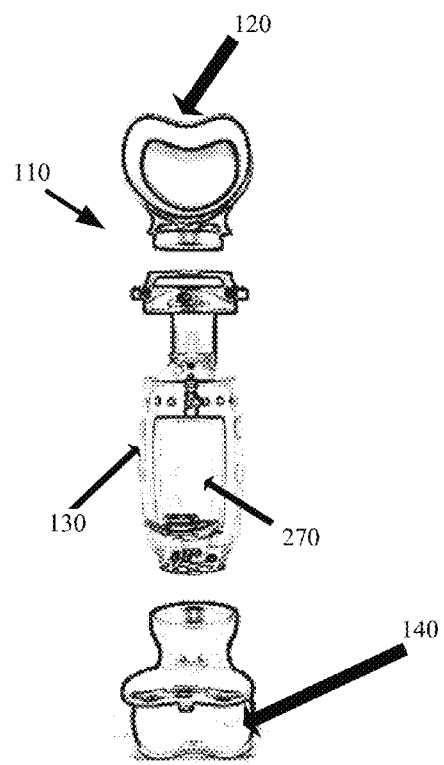
Figure 2C:
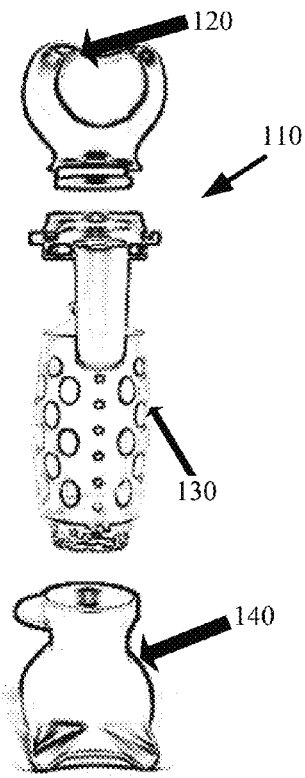
Figure 2D:
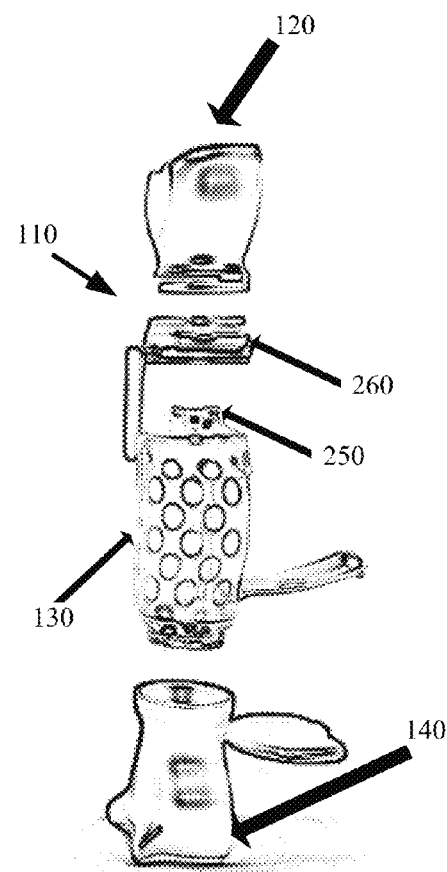

FIG. 1A displays the apparatus 110 from a side view, FIG. 1B displays the apparatus 110 from a front view, and FIG. 1C displays the apparatus 110 from a back view in accordance with some embodiments. FIGS. 2A, 2B, 2C, and 2D provide exploded views of the apparatus 110 to illustrate the components of the overall unit. The apparatus 110 includes three primary components: 1) watering dish 120, 2) body 130, and 3) treat compartment 140.

In some embodiments, the apparatus 110 extends twelve inches in height with an approximate width of four inches at the top and bottom and two and a half inches in the center. However, in different embodiments, the apparatus 110 is sized for different animals. As such, the apparatus 110 can be constructed with the same components albeit at a reduced size for small animals (e.g., up to eight inches in height with a central width up to two inches) and with the same components albeit at a larger size for larger animals (e.g., up to twenty four inches in height with a central width up to six inches).

Figure 3A:
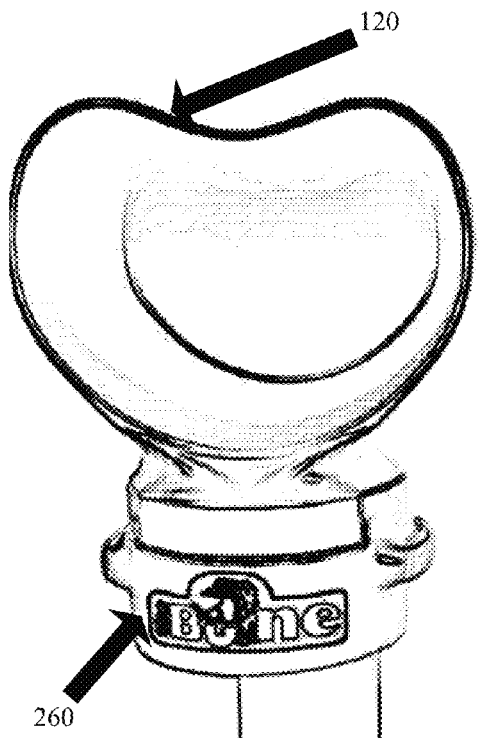
FIGS. 3A and 3B illustrate the coupling and decoupling of the watering dish.
Figure 3B:
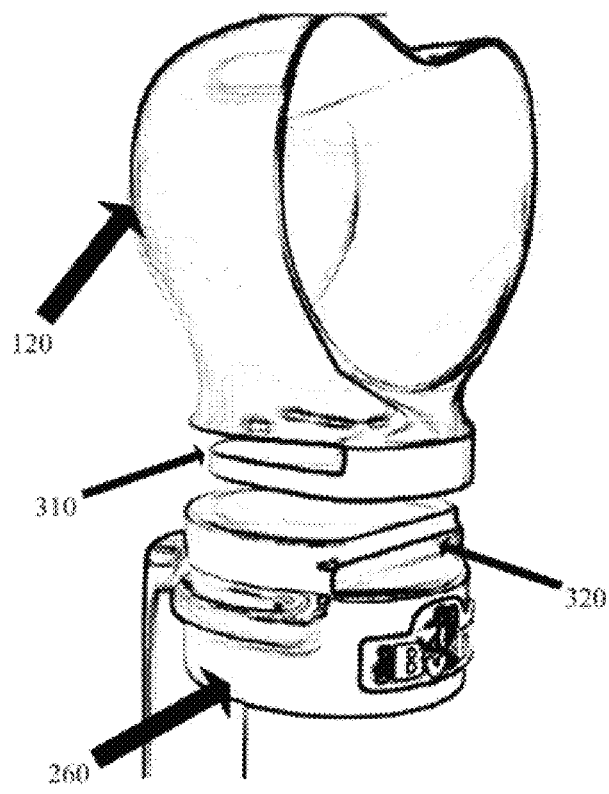

In some embodiments, the watering dish 120 is made of plastic and is approximately four inches wide and three inches high. From the figures it should be apparent that the watering dish 120 is shaped to resemble one end of a dog bone. The watering dish 120 can be coupled to and removed from the body 130. This allows the watering dish 120 to be transported with the rest of the apparatus 110, as one unit, when it is coupled to the body 130. Also, the watering dish 120 can be separated to provide a liquid containing receptacle from which the animal can drink. The coupling and decoupling of the watering dish 120 is illustrated in FIG. 3A and 3B. As shown, the watering dish 120 includes one end of a male-female coupling mechanism that couples to the other end of the male-female coupling mechanism on the cap 260. Specifically as seen in FIG. 3B, the watering dish 120 is provided a tongue-like protrusion 310 that slides into and couples to a groove-like slot 320 in the cap 260.

As will be described below, the watering dish 120 couples to a cap 260 that is itself coupled to the body 130. Some embodiments employ a clipping mechanism that functions similar to a tongue and groove joint to couple and detach the watering dish 120. Stated differently, the coupling mechanism can include a male coupling end (i.e., extension) that couples to a female coupling end (i.e., slit) where either the male or female coupling end can be on the watering dish 120 and the corresponding coupling end can be on the cap 260 or body 130.

The water or liquid for the watering dish is contained within the body 130. Specifically, the body 130 contains a chamber at its center that holds the drinking water or other liquid for the animal. The water chamber is closed at one end and open at the other end. In some embodiments, the open end includes screwable threads. The open end of the body 130 and the screwable threads can be seen by reference to reference marker 250 in FIGS. 2A and 2D.

In some embodiments, the open end of the water chamber is sealed with the screwable cap 260. Specifically, the screwable cap 260 screws onto the threads of the water chamber forming a water-tight seal. As was noted above with reference to FIGS. 3A and 3B, the watering dish 120 also couples to and decouples from the screwable cap 260.

Figure 4A:
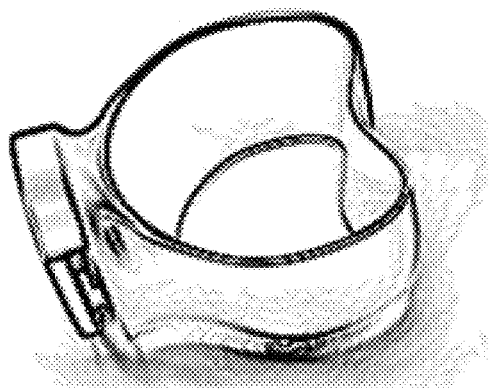
FIGS. 4A, 4B, 4C, and 4D illustrate hoops for attaching a strap to the apparatus.
Figure 4B:
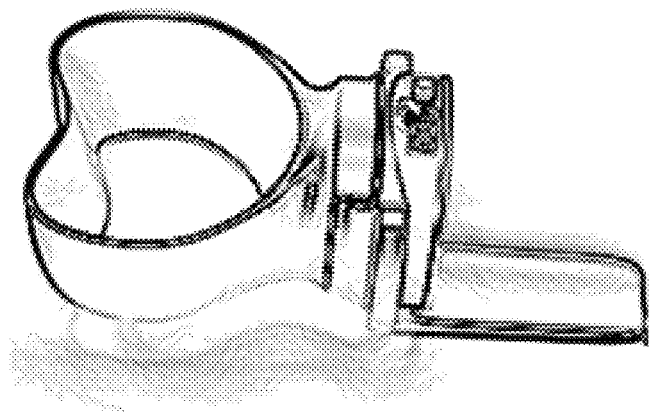
Figure 4C:
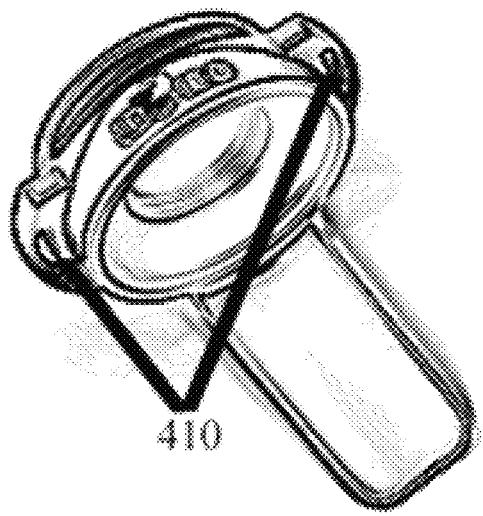
Figure 4D:
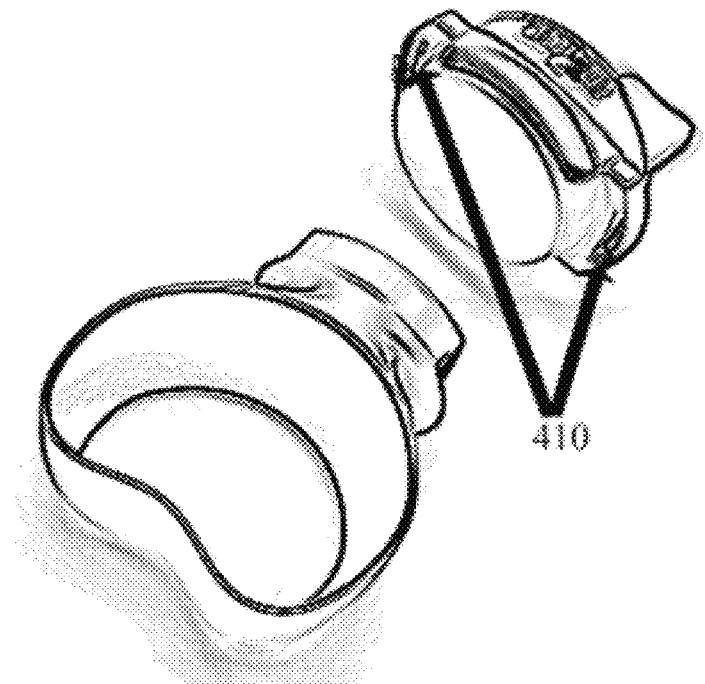

In some embodiments, a belt clip is integrated to the cap 260 to allow the entire apparatus 110 to be carried on a user's belt. The belt clip can be two inches long and one inch wide. In some embodiments, there are two hoops integrated on the cap 260. These hoops can be attached to a shoulder strap and used to carry the apparatus 110. The hoops are illustrated by reference markers 410 in FIGS. 4C and 4D.

When the cap 260 is unscrewed, the liquid from the water chamber can be poured into the watering dish 120. The animal can then drink from the watering dish 120. In some embodiments, the body 130 is up to eight inches long with a diameter up to four inches. Based on these dimensions, the water chamber can hold up to sixteen fluid ounces.

In some embodiments, the apparatus 110 allows water to pass from the water chamber into the watering dish 120 without the user having to uncouple the watering dish 120 and unscrew the cap 260 to open the water chamber. In some such embodiments, the cap 260 is replaced with an adjustable plug that moves in a first direction to seal the open end of the water chamber and slides in the opposite direction to unseal the water chamber and allow water to flow from the water chamber into the water dish 120. FIGS. 5A, 5B, 5C, and 5D illustrate different views for an implementation using an adjustable plug 510 to control the passage of liquid from the water chamber to the watering dish 120 in accordance with some embodiments.

Figure 5A:
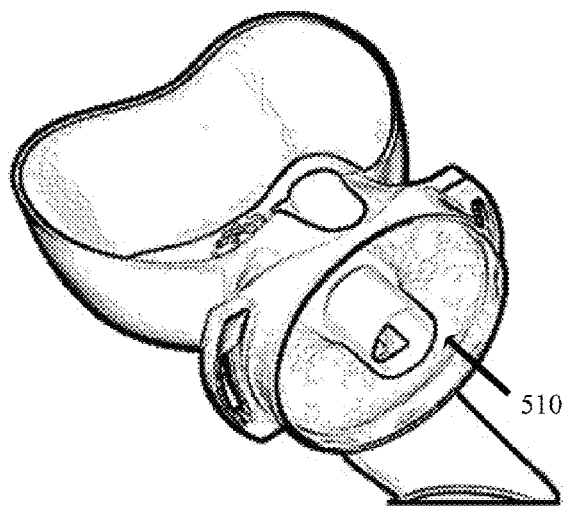
FIGS. 5A, 5B, 5C, and 5D illustrate different views for an implementation using an adjustable plug to control the passage of liquid from the water chamber to the watering dish in accordance with some embodiments.
Figure 5B:
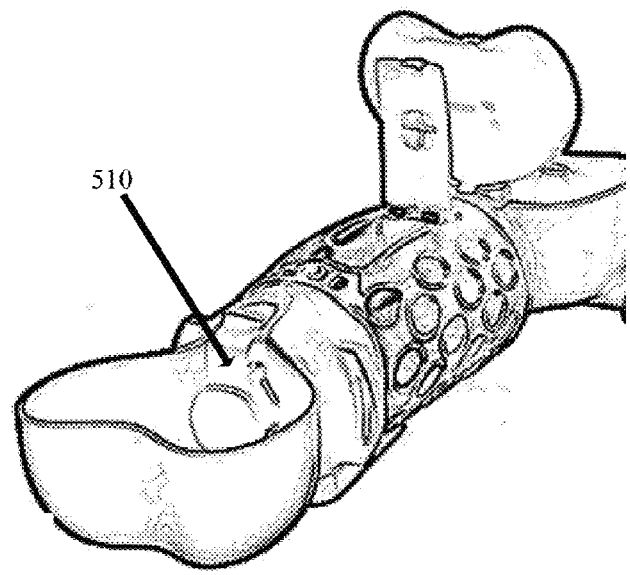
Figure 5C:
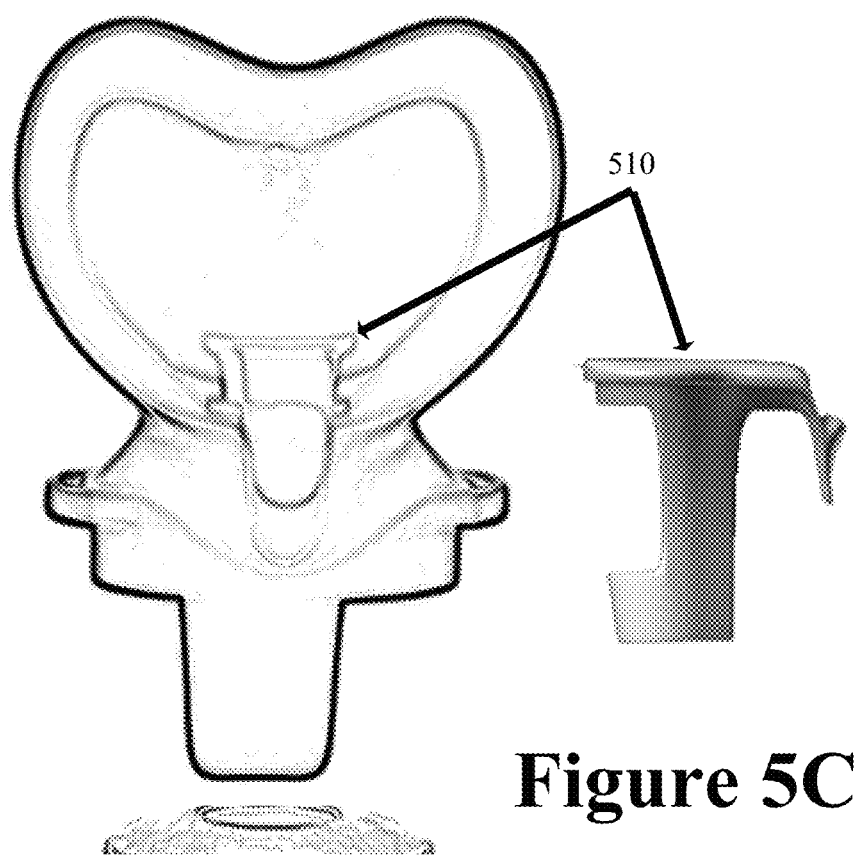
Figure 5D:
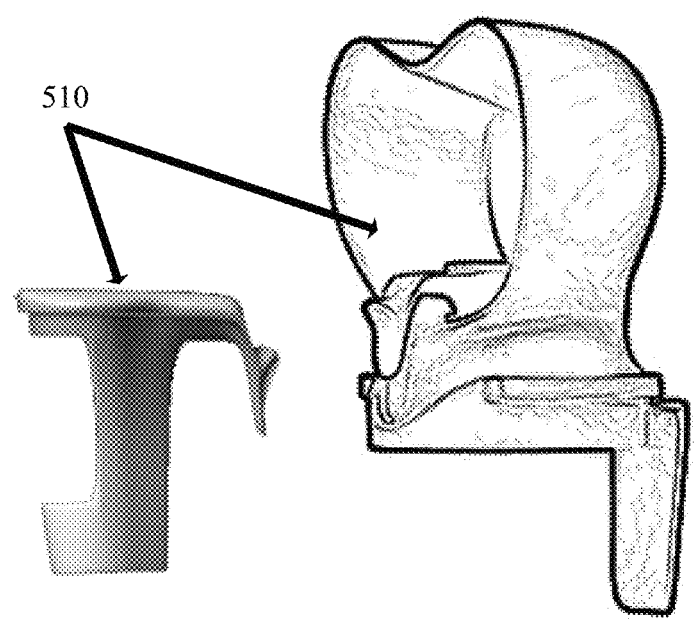

As shown in FIGS. 5A 5B, a hole is created towards the coupling end of the watering dish 120. This aligns with the opening of the water chamber when the watering dish 120 is coupled to or otherwise integrated as part of the body 130. The adjustable plug 510 can be pushed into the hole in order to create a seal that blocks the liquid from flowing out of the water chamber. Specifically, the top end of the adjustable plug 510 is sized larger than the hole to create the seal. To supplement the seal, some embodiments include a rubberized washer under the top end of the plug 510. To further supplement the seal, some embodiments provide a descending groove at the base of the watering dish 120 into which the top end of the plug and/or washer sits. The adjustable plug 510 can be pushed away from the hole using one's thumb. In so doing, the seal is opened and liquid can once again flow out from the water chamber and directly into the watering dish 120.

The benefit to the adjustable plug 510 implementation is simplified usage. The user no longer decouples the watering dish 120 from the body, unscrews the cap sealing the water chamber, and pours the liquid into the watering dish 120. With the adjustable plug 510, the user need only open the plug and tilt the apparatus 110 such that water flows out from the water chamber and into the watering dish 120. The apparatus 110 can then be placed on its back against a surface where it will lay flat, allowing the animal to drink the liquid from the watering dish 120. When the animal has finished drinking, the apparatus 110 can be tilted upright such that the water flows back into the watering dish 120 hole where it is deposited back into the water chamber. The user then pushes the adjustable plug 510 back into the hole to seal the water chamber. In some such embodiments, the watering dish 120 is integrated to the body as one piece.

To prevent the adjustable plug 510 from getting lost, some embodiments have a shaft that extends from the plug 510 and through the watering dish 120 hole. A stopper is integrated at the end of the shaft to prevent the plug 510 from being fully withdrawn from the watering dish 120 hole or from the water chamber. Specifically, the stopper is a lip or obtuse extension with a circumference that is larger than that of the watering dish 120 hole. Moreover, some embodiments provide a rail or groove mechanism within the hole of the watering dish 120 along which the plug shaft slides. The plug shaft may be cylindrical or conical in shape with a central cavity and a cavity about at least one side. These cavities allow the liquid to flow from the water chamber through the plug shaft and into the watering dish 120.

In some embodiments, the adjustable plug 510 is substituted with a drain cap. In some such embodiments, a hollowed shaft extends downward from the opening of the watering dish 120 partly into the opening of the water chamber. This shaft is threaded. Partly inset in the shaft is a drain cap. The drain cap includes a stopper top extending out atop the shaft, a threaded extension that screws into the threads of the shaft, and stopper bottom at the end of the threaded extension that prevents the drain cap from being fully pulled out of the shaft. In this embodiment, the water chamber can be sealed by turning the drain cap in one direction to screw into the watering dish 120 hole and can be opened by turning the drain cap in the opposite direction.

Figure 6:
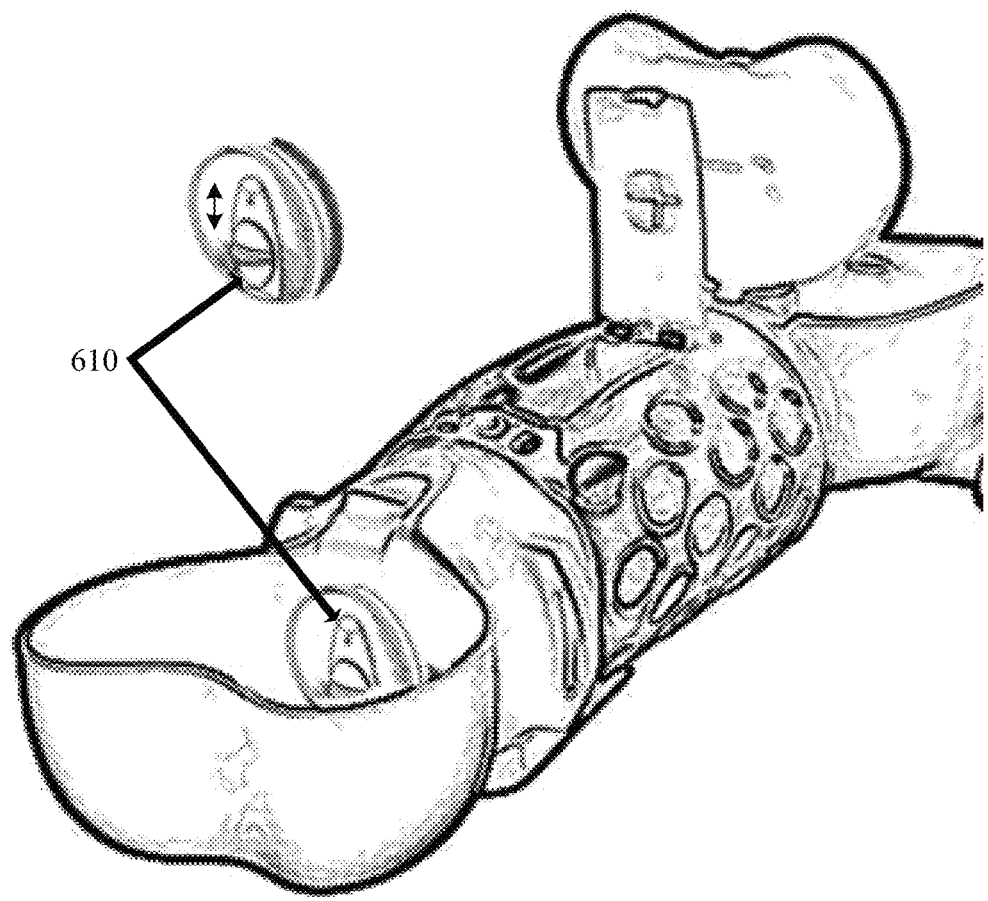
FIG. 6 illustrates an embodiment of the sliding cover.

Some embodiments provide a sliding cover implementation for sealing and opening the water chamber. In some such embodiments, the watering dish 120 includes grooves or slits along the base that connects to the apparatus body 130. Inset within the grooves or slits is a sliding cover. The sliding cover is usable to open or block the hole in the watering dish 120 through which liquid flows from the water chamber into the watering dish 120. When the sliding cover is pushed into the watering dish 120 body, the sliding cover blocks the hole, thereby sealing the water chamber and blocking the flow of water. Pulling the sliding cover away from the watering dish 120 body, opens the hole and allows the water to flow into and out of the watering dish 120. An embodiment of the sliding cover is illustrated in FIG. 6. The figure illustrates a sliding cover 610 that is part of the watering dish 120 and located over a channel that allows water to flow from the water chamber in the body 130 to the watering dish 120. The sliding cover 610 can be slid down to block the channel and slid up to open the channel.

In some embodiments, the sliding cover is spring loaded. Specifically, a spring is used to provide a default closed or sealed position for the sliding cover. The user then applies a temporary counter-force to deviate the sliding cover from its default position and open the hole and allow the liquid to pass through. When the user removes the counter-force, the sliding cover closes as a result of the spring force, once again sealing the water chamber.

In some embodiments, a button is provided about the watering dish or apparatus body 130. The button is connected to the spring loaded sliding cover and activates the sliding cover to temporarily open the passage for the liquid to transfer from the water chamber to the watering dish. The button can operate as a lever, whereby the button is connected to the sliding cover with an intermediary connecting segment. When the button is pressed, the lever is actuated and the sliding cover moves.

In still some other embodiments, a latch, spring, and button mechanism controls access to the water chamber. The latch holds a cover in position sealing the water chamber and preventing the flow of water. In this implementation, the button is connected to the latch. When the button is pressed, the latch is moved from its position. This then allows the spring to apply a force on the cover which moves the cover from the closed position to the open position. Water can then flow out from the water chamber. The water chamber is closed when the user pushes the cover back to the closed position where it is engaged and held in the closed position by the latch.

Figure 7:
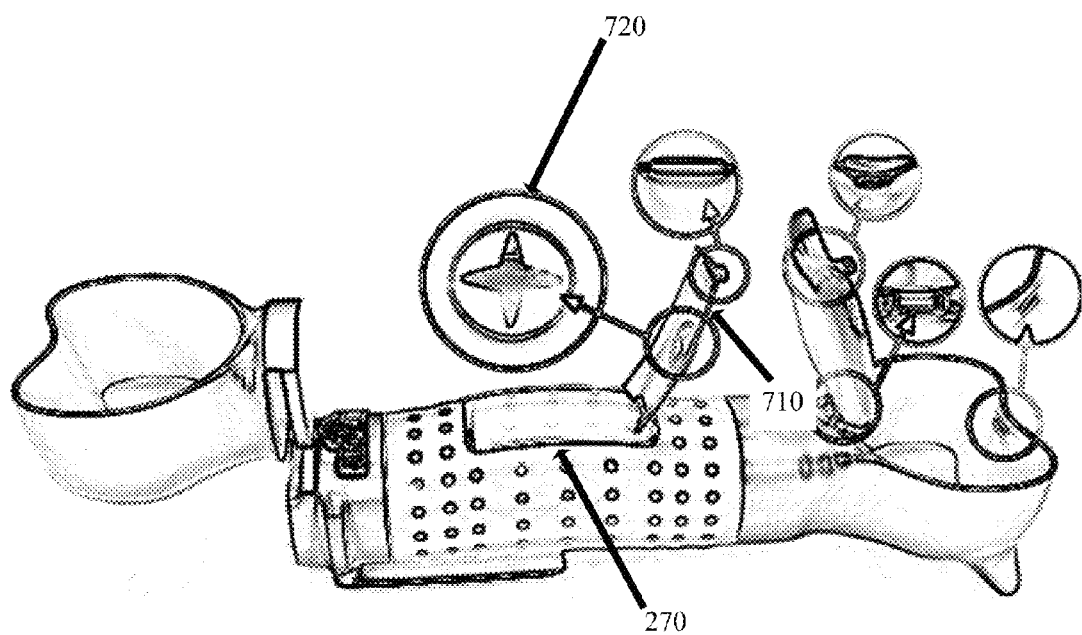
FIGS. 7 and 8 provide a detailed view of the secondary chamber for storing and dispensing the waste disposal bags.
Figure 8:
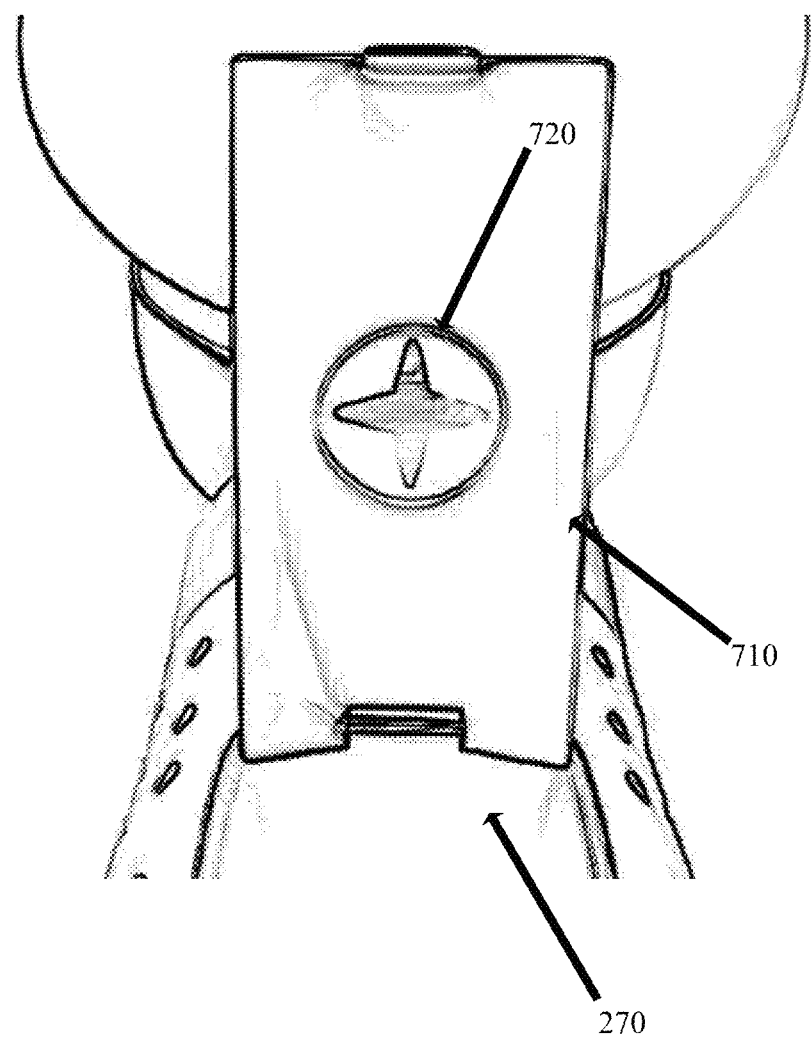

A second utility embedded within the apparatus 110 of some embodiments is the storage and dispensing of waste disposal bags. To provide this utility, the apparatus body 130 includes a secondary chamber towards its center. The secondary chamber is completely separated from the water chamber or primary chamber. The secondary chamber storing and dispensing the waste disposal bags is illustrated by reference marker 270 in FIG. 2. Unlike the water chamber that is accessed from the top of the body 130, the secondary chamber 270 is accessed from the side of the body 130. FIGS. 7 and 8 provide a detailed view of the secondary chamber 270.

As shown, the secondary chamber 270 is a shallow cavity that is adjacent to but fully insulated from the water chamber. The cavity is configured to hold a roll of refuse bags for proper disposal of animal waste. A clasping door 710 covers the secondary chamber 270. Additional bags can be inserted into the secondary chamber when the door 710 is unclasped. The door 710 contains a hole or eyelet 720 towards its center. Part of a topmost bag can be inserted through the hole 720 to allow fast retrieval of a bag without having to open the door. The user simply pulls the part of the bag that is exposed through the hole 720 and the remainder of the bag slides through the opening. In some embodiments, the eyelet 720 facilitates the separation of one bag from the next.

Figure 9A:
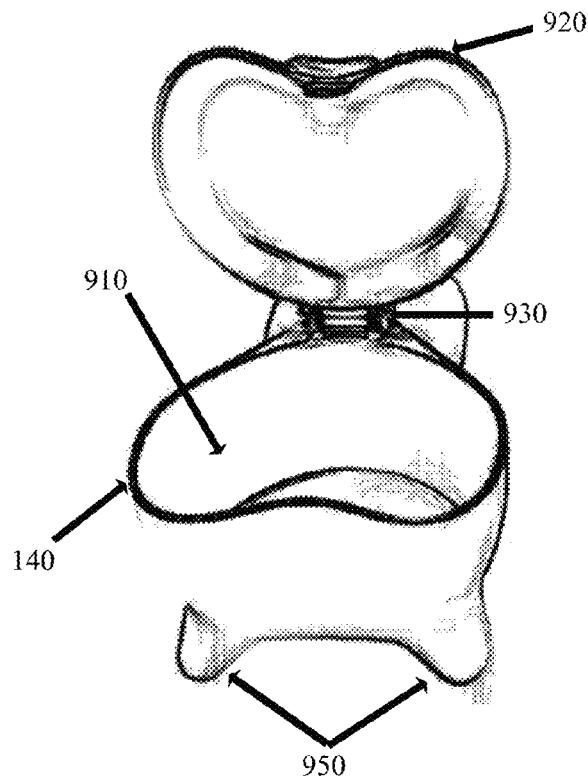
FIGS. 9A and 9B provide two isolated views of the treat compartment.
Figure 9B:
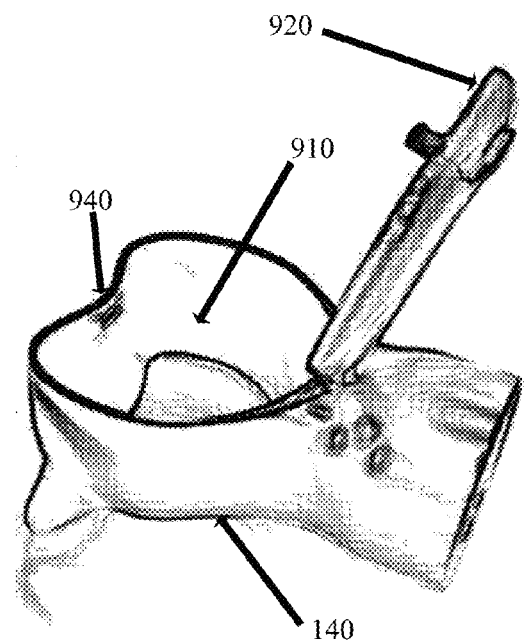

A third utility embedded within the apparatus 110 of some embodiments is the storage and serving of food or animal treats. Detachably coupled or integrated to the end of the body 130 that holds the watering dish 120 is the treat compartment 140. FIGS. 9A and 9B provide two isolated views of the treat compartment 140.

In some embodiments, the treat compartment 140 is made of plastic and is four inches wide and three inches high. Similar to the watering dish 120, the treat compartment 140 is also shaped like one end of a dog bone. The treat compartment 140 contains a cavity 910 for holding food or treats for the animal. A clasping door 920 holds the food in the cavity 910 until the user wishes to feed the animal. The door 920 is secured to the treat compartment 140 by one or more hinges 930 and a clip or latch 940 holds the door closed. The animal can feed directly from the treat compartment 140 by opening the treat compartment 140 door and laying the apparatus 110 against a surface on its back. The apparatus 110 will lay flat due to the its shape. The user can also fill the watering dish 120 with water to allow the animal simultaneous access to food and water. On the lower, outside, back end of the treat compartment 140, there are "feet" 950 or nubs which allow the apparatus 110 to stand vertically. These feet 950 also provide stability when the apparatus 110 lies horizontally to let the animal eat and drink.

In some embodiments, the treat compartment 140 is affixed to the apparatus body 130. In some other embodiments, the treat compartment 140 is detachably coupled to the apparatus body 130 such that it can be removed from the body 130. In some such embodiments, the treat compartment 140 comprises one end of a male-female coupling mechanism and the apparatus body 130 comprises the other end. In still some embodiments, the treat compartment 140 screws onto and off of the end of the body 130 with at least one of the treat compartment 140 and body 130 comprising the threads and the other comprising the grooves.

We claim:

1. An apparatus comprising:
   a body comprising a first chamber and a separate second chamber, the second chamber having an exposed front side with top, bottom, back, left, and right sides of the second chamber surrounded by the first chamber, the first chamber comprising an opening at a top of the body leading into a sealable first volume for storing liquid, and the second chamber comprising a first cavity and a first clasping door centered about the body and providing access to the first cavity from the second chamber front side, the first clasping door comprising an opening through which a portion of a bag stored within the cavity is passed through to allow for easy retrieval of said bag;
   a first receptacle coupling to the top of the body over said first chamber opening, the first receptacle comprising a second open volume configured to serve the liquid from the first chamber; and
   a second receptacle coupling to a bottom of the body, the second receptacle comprising a second cavity in which food is contained and served, and a second clasping door comprising an open position and a closed position, wherein the second clasping door at the open position provides access to the food in the second cavity, and wherein the second clasping door at the closed position covers said second cavity and prevents the food from falling out of the second cavity during transport.

2. The apparatus of claim 1 further comprising an adjustable plug with a first position and a second position, wherein the adjustable plug at the first position seals the first chamber opening and prevents the liquid from exiting the first chamber, and wherein the adjustable plug at the second position unseals the first chamber opening and allows the liquid to flow out from the first chamber.

3. The apparatus of claim 2, wherein the first receptacle comprises an opening that is aligned with the first chamber opening, wherein the first receptacle opening allows the liquid to flow directly from the first chamber into the first receptacle when the adjustable plug is at the second position.

4. The apparatus of claim 1, wherein the first receptacle comprises one end of a male-female coupling mechanism and the body comprises a complimentary end of the male-female coupling mechanism, and wherein the first receptacle decouples from and is removed from the body by separating the ends of the male-female coupling mechanism.

5. The apparatus of claim 1, wherein the second receptacle comprises a pair of nubs stabilizing a vertical and horizontal stance of the apparatus.

6. The apparatus of claim 1, wherein the first chamber opening comprises threads and a plug that screws into said threads to seal the first chamber.

7. The apparatus of claim 1 further comprising a plug sliding into a closed position when pushed and sliding into an open position when pulled, wherein the plug at the closed position prevents transfer of the liquid from the first chamber to the first receptacle, and wherein the plug at the open position provides for unrestricted transfer of the liquid from the first chamber to the first receptacle.

8. The apparatus of claim 1 further comprising a moveable cover and a button controlling a position of the moveable cover, wherein the button causes the moveable cover to move to an open position when the button is pressed and the button causes the moveable cover to move to a closed position when the button is not pressed, wherein the moveable cover at the closed position prevents transfer of the liquid from the first chamber to the first receptacle, and wherein the moveable cover at the open position provides for unrestricted flow of the liquid from the first chamber to the first receptacle.

9. The apparatus of claim 1, wherein the first receptacle comprises a protrusion and the top of the body comprises a groove into which the first receptacle protrusion slides into when coupling the first receptacle to the body adjacent to the first chamber, and wherein the second receptacle comprises a protrusion and the bottom of the body comprises a groove into which the second receptacle protrusion slides into when coupling the second receptacle to the body at an opposite end from the first receptacle.

10. The apparatus of claim 1 further comprising a plurality of refuse bags stored within the first cavity of the body.

11. A portable animal watering, feeding, and waste bag storage and dispensing apparatus comprising:
    a body comprising (i) a cylindrical first chamber with a cavity located about a center of the first chamber and (ii) a separate and isolated second chamber disposed in said cavity of the first chamber, the first chamber forming a first volume surrounding the second chamber and leaving a front side of the second chamber exposed, the first chamber comprising a first opening adapted for pouring liquid into and out of the first volume, the second chamber comprising a second volume adapted for waste bag storage, and the second chamber further comprising a clasping door located about the second chamber front side, the clasping door having an eyelet adapted for dispensing of waste bags from the second volume;
    a first receptacle extending above the first chamber from a top end of the body, the first receptacle comprising an adjustable plug, a second volume, and a second opening aligned with the first opening, wherein the adjustable plug moves between an open position and a closed position in response to push and pull forces, wherein the adjustable plug at the closed position creates a blockage between the first opening and the second opening that prevents transfer of liquid from the first chamber to the first receptacle, and wherein the adjustable plug at the open position removes said blockage allowing the transfer of the liquid from the first chamber to the first receptacle; and
    a second receptacle extending below the body from an opposite bottom end of the body, the second receptacle forming a third volume in which food is contained and served, the second receptacle comprising a clasping door having an open position and a closed position, wherein the clasping door at the open position provides access to the food contained in the third volume, and wherein the clasping door at the closed position covers the third volume and prevents the food from falling out of the second receptacle during transport.

12. The apparatus of claim 11 further comprising a pair of nubs behind the second receptacle, wherein the pair of nubs support a vertical stance of the apparatus when the apparatus is placed upright on a surface.

13. The apparatus of claim 11 further comprising a button and a lever connected to the adjustable plug, and wherein pressing the button activates the lever and moves the adjustable plug to the open position.

14. The apparatus of claim 11, wherein the adjustable plug moves from the open position to the closed position in response to a push force.

15. The apparatus of claim 14, wherein the adjustable plug moves from the closed position to the open position in response to a pull force.

16. The apparatus of claim 11, wherein the first receptacle has a shape representative of one end of a dog bone and the second receptacle has a shape representative of another end of the dog bone.

17. The apparatus of claim 11 further comprising a strap and at least one hoop retaining said strap.

* * * * *